(12) United States Patent
Henry et al.

(10) Patent No.: US 8,277,913 B2
(45) Date of Patent: Oct. 2, 2012

(54) FOAMED POLYVINYLIDENE FLUORIDE TUBULAR STRUCTURES

(75) Inventors: James J. Henry, Downingtown, PA (US); Saeid Zerafati, Villanova, PA (US); Sean M. Stabler, Montoursville, PA (US)

(73) Assignee: Arkema Inc., King of Prussia, PA (US)

( * ) Notice: Subject to any disclaimer, the term of this patent is extended or adjusted under 35 U.S.C. 154(b) by 294 days.

(21) Appl. No.: 12/598,297

(22) PCT Filed: Apr. 29, 2008

(86) PCT No.: PCT/US2008/061831
§ 371 (c)(1),
(2), (4) Date: Oct. 30, 2009

(87) PCT Pub. No.: WO2008/137393
PCT Pub. Date: Nov. 13, 2008

(65) Prior Publication Data
US 2010/0119748 A1    May 13, 2010

(51) Int. Cl.
*B29D 22/00* (2006.01)
*B29D 23/00* (2006.01)
*B32B 1/08* (2006.01)

(52) U.S. Cl. ............ 428/36.91; 428/421; 428/422; 264/45.9

(58) Field of Classification Search ............ 428/35.7, 428/36.9, 36.91, 36.92, 36.5, 304.4, 421, 428/422; 264/45.9
See application file for complete search history.

(56) References Cited

U.S. PATENT DOCUMENTS

| | | |
|---|---|---|
| 4,781,433 A | 11/1988 | Arroyo et al. |
| 6,147,309 A | 11/2000 | Mottine et al. |
| 6,360,489 B1 | 3/2002 | Burge et al. |
| 6,790,870 B1 | 9/2004 | DeSimone et al. |
| 2004/0165957 A1 | 8/2004 | Serrano et al. |
| 2005/0154106 A1 | 7/2005 | Henry et al. |

*Primary Examiner* — Michael C Miggins
(74) *Attorney, Agent, or Firm* — Thomas F. Roland

(57) ABSTRACT

The invention relates to foamed polyvinylidene tubular structures—and particularly those for use as conduit. The tubular structures may be corrugated, and are especially useful for fiber-optic plenum conduit. The polyvinylidene foam may also be directly applied to fiber optic cable.

9 Claims, No Drawings

FOAMED POLYVINYLIDENE FLUORIDE TUBULAR STRUCTURES

FIELD OF THE INVENTION

The invention relates to foamed polyvinylidene fluoride tubular structures—especially those for use as conduit, and particularly for plenum conduit. The tubular structures may be corrugated, and are especially useful for fiber-optic plenum conduit. The polyvinylidene foam may also be directly applied to fiber optic cable as primary insulation, as a jacket or as a foamed support structure in the cable.

BACKGROUND OF THE INVENTION

Polyvinylidene Fluoride is commonly used to produce tube products for wire and cable applications, as well as for jackets and primary insulation on wire and cable products. Copper, fiber optic, and plenum cables and conduit exist in large numbers in most commercial buildings. In the case of tubular structures, a common product referred to as a corrugated innerduct, is used for routing fiber optic cables in buildings. The current product is a solid PVDF tube that contains corrugations. Polyvinylidene fluoride (PVDF) is the preferred material for conduit used in these plenum applications because of its inherent toughness, inertness, and especially its flame and smoke resistance. Other materials, such as polyvinyl chloride (PVC) and polyolefins, and even other fluoropolymers do not have the same balance of properties that PVDF provides.

One problem with PVDF, is the relatively high cost. The cost of a PVDF conduit can be lowered by adding fillers, including inorganic fluoride fillers, as described in U.S. patent application Ser. No. 11/158,235. Unfortunately the physical properties of the filled materials are not as good as non-filled PVDF structures, tending to be stiffer and have marginal crack resistance.

U.S. Pat. No. 4,322,260 described the use of acrylonitrile/butadiene/styrene polymer foam as the insulation in double-walled conduit structures. Foamed fluoropolymers mixtures of ethylene/tetrafluoroethylene and ethylene/chlorotrifluoroethylene have been used as an insulation directly on wire or cable, as described in U.S. Pat. No. 5,770,819. U.S. Pat. No. 6,231,919 describes an advantage using a solid or liquid blowing agent rather than gases for producing foamed fluoropolymers wire coatings. The useful fluoropolymers are listed as fluorinated ethylene-propylene, and perfluoroalkoxypolymers (such as tetrafluoroethylene and perfluoropropylvinylether. None of these references describe a foamed fluoropolymer conduit, and none describes polyvinylidene fluoride foam.

A polyvinylidene fluoride foam is described in U.S. Pat. No. 7,081,216. The foam is produced by freezing a PVDF emulsion, followed by thawing.

It has now been found that a polyvinylidene conduit can be formed using foamed PVDF. The foamed conduit is lighter, more flexible, and less expensive than solid PVDF conduit, while retaining good physical properties and flame and smoke resistance.

SUMMARY OF THE INVENTION

The invention relates to foamed polyvinylfluoride tubular structures, especially to those used as conduit or for jacketing of fiber optic cable.

The invention also relates to a process for forming foamed polyvinylfluoride tubular structures.

DESCRIPTION OF THE INVENTION

The invention relates to a foamed polyvinylidene fluoride (PVDF) tubular structure.

By "tubular structure" as used herein is meant a structure that is much longer than it is thick, having a continuous passage through the structure in the length-wise direction. The structure may be of any cross-sectional shape, including a preferred circular shape, and may also be corrugated (having ridges running in the direction of the tube length). The passage in the middle of the tube may contain empty space; be partially filled with other components (such as fiber optic cable or copper wires); or be completely filled by a fiber optic cable or other structure, in which the PVDF foam is directly in contact with the other structure.

The term "polyvinylidene fluoride", as used herein, includes both normally solid, high molecular weight homopolymers and copolymers within its meaning. Such copolymers include those containing at least 50 mole percent of vinylidene fluoride copolymerized with at least one comonomer selected from the group consisting of tetrafluoroethylene, trifluoroethylene, chlorotrifluoroethylene, hexafluoropropene, vinyl fluoride, pentafluoropropene, perfluoromethyl vinyl ether, perfluoropropyl vinyl ether and any other monomer that would readily copolymerize with vinylidene fluoride. Particularly preferred are copolymers composed of from at least about 70 and up to 99 mole percent vinylidene fluoride, and correspondingly from 1 to 30 percent tetrafluoroethylene, about 70 to 99 percent vinylidene fluoride and 1 to 30 percent hexafluoropropene; and about 70 to 99 mole percent vinylidene fluoride and 1 to 30 mole percent trifluoroethylene. Terpolymers of vinylidene fluoride, hexafluoropropene and tetrafluoroethylene and terpolymers of vinylidene fluoride, trifluoroethylene and tetrafluoroethylene are also representatives of the class of vinylidene fluoride copolymers which can be used. The polyvinylidene fluoride resin used in the invention may also be a mixture of one or more different polyvinylidene fluoride resins.

The molecular weight and composition of the polyvinylidene fluoride to obtain the desired processability and final product properties.

The polyvinylidene fluoride is generally made by a suspension, emulsion, or supercritical $CO_2$ process.

The polyvinyl fluoride polymer is formed into a foam by the addition of a foaming agent. The foaming agent may be a gas (such as Freon or nitrogen), or a solid or liquid foaming agent. Generally the foaming agent is added into an extruder system, the foam forming immediately upon the exodus of the mixture from the extruder.

In one embodiment, a foam concentrate is added to the polyvinylidene fluoride softened resin at a level of from 1 to 10 percent by weight, and preferably from 2 to 5 percent by weight, based on the weight of the polyvinylidene fluoride.

The foam produced reduces the density of the final product by at least 5 percent.

In addition to the polyvinylidene fluoride resin and foaming agent, the composition of the invention may further contain other additives. Examples of other additives include, but are not limited to: flame retardants, dyes or colorants, fillers, impact modifiers, and other polymers. Flame retardants include, but are not limited to, tungstates, molybdates and silicates. An especially preferred flame retardant is calcium tungstate. The flame retardants are generally added to the composition at a level of from 0.02 to 2.0 weight percent, based on the weight of polyvinylidene fluoride. In a preferred embodiment, the foamed PVDF meets the flame and smoke requirements as defined in the Steiner Tunnel test method, UL 2024. The foamed conduit of the invention can meet the plenum requirements specified in NFPA-262.

Dyes and colorants may be added as color concentrates at levels between 1 and 5% based on the total amount of polymer. Fillers, at levels of up to 40 percent by weight, based in the polyvinylidene fluoride may be added. The fillers include inorganic fillers, polymeric fillers, and mixtures thereof. The addition of filler can help reduce the cost of the composition, though some loss in performance properties will result. Inorganic fillers include, but are not limited to, zinc oxide, calcium carbonate, and inorganic fluorides such as calcium fluoride. Polymer additives include acrylics and other polymers compatible with PVDF. Processing aids, such as polytetrafluoroethylene (PTFE), may be added to optimize processing conditions, such as a reduction in the coefficient of friction.

The foamed structures of the invention are generally formed in an extrusion or coextrusion process.

In a preferred embodiment, the foamed tubular polyvinylidene fluoride composition is formed into a conduit. In a more preferred embodiment, the conduit is formed into a corregated conduit by the application of vacuum, pressure or both. Corregation provides a more flexible tubular structure, with improved structural integrity.

In one embodiment of the invention, a solid inner liner is formed into a tube, onto which the foamed polyvinylidene fluoride composition is extruded. The solid inner liner could be a polymer, such as solid PVDF, polyvinylidene chloride (PVC), or polyethylene (PE). The inner liner might also consist of a metal sheath, such as, but not limited to steel and aluminum, forming an armored conduit. In this case armored cable is produced by a process where a metal is wound over the cable in a manner that creates an interlocking outer metal tube over the cable. The PVDF and other additives are blended together, and a foaming agent either added to the blend, or in the case of a gas, directly injected into the extruder. Upon exiting the extruder, the gases from the foaming agent expand the PVDF composition to form a foam over the armored cable.

Typically, the foamed tubular structure of the invention has an outside diameter of from 10 millimeters (0.25 inches) to 20 centimeters (8 inches). Wall thickness can range from 0.005 inches up to 0.050 inches.

The foamed PVDF tubular structure of the invention is light, tough, chemically resistant and flexible.

The tubular structure is useful as a conduit of electrical and fiber optic cable, as a replacement for current solid-walled PVDF conduit. The foamed conduit may be referred to as a plenum cable, raceway, innerduct, or similar designation. Additionally, the foamed PVDF can be applied directly to optical cable or onto other substrates as a tough, low-density, flexible coating or insulation.

EXAMPLES

A foam concentrate at a level of 3 percent is blended into KYNAR3120-15 and extruded using a barrel temperature set up to 460° F. and with die and tooling set at temperatures as high as 480° F. (or at temperatures adequate to activate the foaming agent to produce the foaming action). The extruder provides melt into a "melt tube" that is designed to introduce material into commercial tube corrugators. The melt tube may need to be specially designed to have the pressure drop primarily focused at the end of the melt tube. Heat may also be required on the melt tube to promote foaming of the KYNAR resin. The KYNAR foams as it exits the melt tube and expands as the gasses created by the foaming concentrate are released. The foam tube is taken within the corrugators and with the use of vacuum, pressure or both, the tube is formed into a corrugated tube product. The final product in the form of a corrugated tube exits the corrugators and is wound up on spools in preparation for shipment. The product may contain a colorant such as provided by an orange color concentrate to produce the final product.

What is claimed is:

1. A tubular structure consisting of a foamed polyvinylidene fluoride (PVDF) composition in the form of a corrugated conduit having a continuous passage containing empty space.

2. The tubular structure of claim 1, wherein said structure comprises a plenum conduit.

3. The tubular structure of claim 1, wherein said composition further comprises from 0.02 to 2 weight percent of one or more flame retardants, based on the weight of said polyvinylidene fluoride.

4. The tubular structure of claim 1, further comprising at least one additive selected from the group consisting of fillers, dyes, colorants and impact modifiers.

5. A process for forming the tubular structure consisting of a foamed polyvinylidene fluoride (PVDF) composition comprising the steps of:
   a. admixing one or more polyvinylidene fluoride resins with at least one foaming agent;
   b. extruding said admixture at a temperature effective to activate the foaming agent to produce a foamed tubular structure.

6. The process of claim 5, wherein said foaming agent is a liquid or solid.

7. The process of claim 6, wherein said foaming agent is added at from 1 to 10 weight percent, based on the weight of polyvinylidne fluoride.

8. The process of claim 5, wherein said foaming agent is a gas, solid or liquid admixed directly into the extruder.

9. The process of claim 5, further comprising the step of corrugating said foamed tubular structure.

* * * * *